US012632656B2

(12) United States Patent
Li et al.

(10) Patent No.: US 12,632,656 B2
(45) Date of Patent: May 19, 2026

(54) TEXT GENERATION INCLUDING DE-DUPLICATION OF DECODED WORD INFORMATION TO SPLICE TARGET WORD INFORMATION INTO AN INFORMATION SEQUENCE

(71) Applicants: BEIJING WODONG TIANJUN INFORMATION TECHNOLOGY CO., LTD., Beijing (CN); BEIJING JINGDONG CENTURY TRADING CO., LTD., Beijing (CN)

(72) Inventors: Haoran Li, Beijing (CN); Peng Yuan, Beijing (CN)

(73) Assignees: BEIJING WODONG TIANJUN INFORMATION TECHNOLOGY CO., LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 303 days.

(21) Appl. No.: 18/272,516

(22) PCT Filed: Dec. 17, 2021

(86) PCT No.: PCT/CN2021/139098
§ 371 (c)(1),
(2) Date: Jul. 14, 2023

(87) PCT Pub. No.: WO2022/151915
PCT Pub. Date: Jul. 21, 2022

(65) Prior Publication Data
US 2024/0320431 A1     Sep. 26, 2024

(30) Foreign Application Priority Data

Jan. 15, 2021   (CN) .......................... 202110053835.3

(51) Int. Cl.
*G06F 40/279* (2020.01)
*G06F 40/284* (2020.01)
(Continued)

(52) U.S. Cl.
CPC ................................. *G06F 40/284* (2020.01)

(58) Field of Classification Search
CPC .... G06F 40/279; G06F 40/284; G06F 40/289; G06F 40/30; G06F 40/35
(Continued)

(56) References Cited

U.S. PATENT DOCUMENTS 5,200,893 A * 4/1993 Ozawa .................. G06F 40/211
715/235
7,526,424 B2 * 4/2009 Corston-Oliver ....... G06F 40/56
704/9
(Continued)

FOREIGN PATENT DOCUMENTS

CN      107832300 A      3/2018
CN      110532560 A      12/2019
(Continued)

OTHER PUBLICATIONS

International Search Report of PCT/CN2021/139098, 5 Pages, dated Mar. 15, 2022.
(Continued)

*Primary Examiner* — Martin Lerner

(57) ABSTRACT

Text generation including de-duplication of decoded word information to splice target word information into an information sequence. In a specific scheme, a decoded-word information group set is determined on the basis of a text to be processed; the decoded-word information group set is de-duplicated to generate a candidate-word information group set; candidate-word information that meets a target condition as target-word information is selected from each (Continued)

200 candidate-word information group in the candidate-word information group set to obtain a target-word information set; if the target-word information meets a convergence condition is determined, the target-word information with a historical target-word information sequence corresponding to the target-word information is spliced on the basis of a preset-word list to generate a target text.

17 Claims, 5 Drawing Sheets

(51) Int. Cl.
    *G06F 40/289*         (2020.01)
    *G06F 40/35*          (2020.01)

(58) Field of Classification Search
    USPC ........................................... 704/1, 9; 706/12
    See application file for complete search history.

(56)               References Cited

U.S. PATENT DOCUMENTS

| | | | | |
|---|---|---|---|---|
| 11,847,424 | B1 * | 12/2023 | Harkous | ................. G06F 40/30 |
| 2005/0120002 | A1 * | 6/2005 | Behbehani | .............. G06F 40/56 |
| 2012/0089397 | A1 * | 4/2012 | Arai | ...................... G06F 40/268 |
| | | | | 704/251 |
| 2017/0323636 | A1 * | 11/2017 | Xiao | ........................ G06F 40/30 |
| 2019/0294588 | A1 * | 9/2019 | Xu | ........................... G06F 40/30 |
| 2019/0325066 | A1 | 10/2019 | Krishna et al. | |
| 2020/0311350 | A1 * | 10/2020 | Makino | ................. G06F 40/284 |
| 2021/0151038 | A1 * | 5/2021 | Manjunath et al. | .... G06F 40/30 |
| 2022/0004720 | A1 * | 1/2022 | Wu | ........................... G06F 40/20 |
| 2022/0366140 | A1 * | 11/2022 | Saito | ..................... G06F 40/279 |
| 2023/0130902 | A1 * | 4/2023 | Saito | ...................... G06F 40/30 |
| | | | | 704/9 |

FOREIGN PATENT DOCUMENTS

| | | |
|---|---|---|
| CN | 111078865 A | 4/2020 |
| CN | 111666418 A | 9/2020 |

OTHER PUBLICATIONS

Written Opinion of PCT/CN2021/139098, 5 Pages, dated Mar. 10, 2022.

* cited by examiner

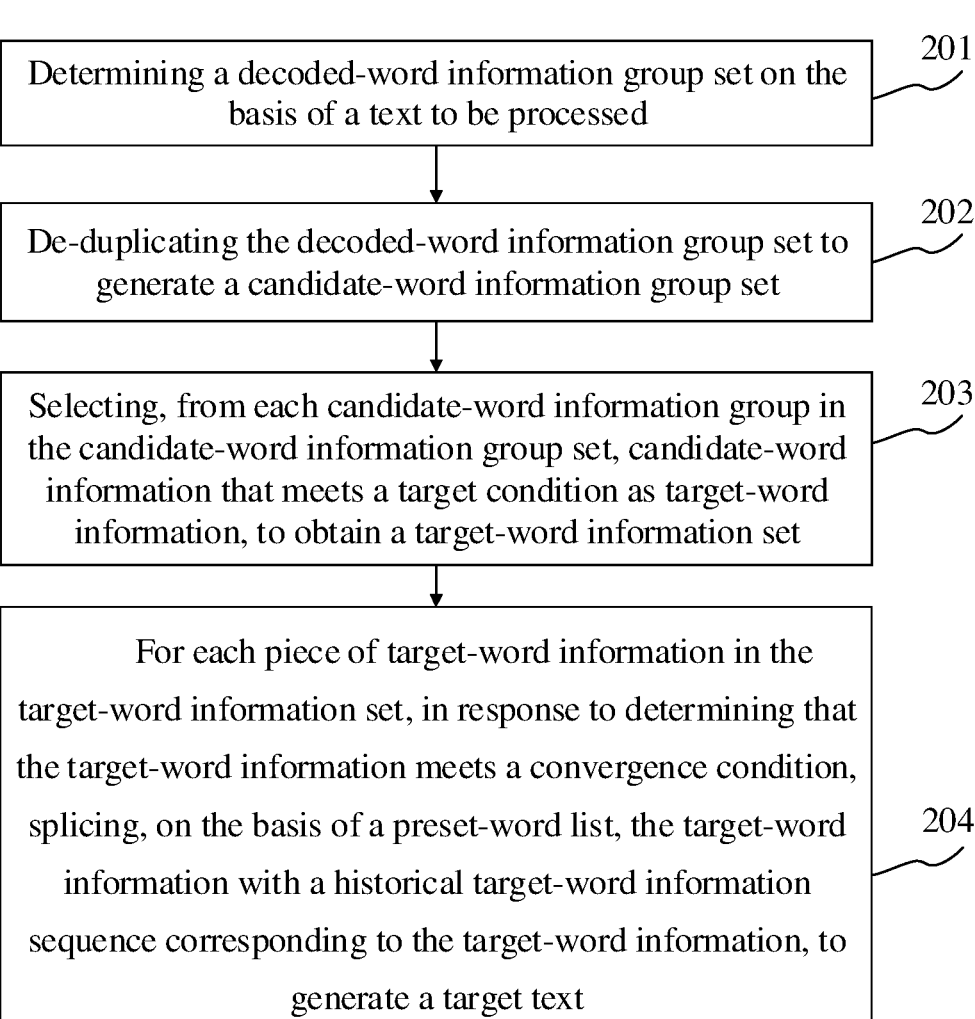

200

Determining a decoded-word information group set on the basis of a text to be processed

201

De-duplicating the decoded-word information group set to generate a candidate-word information group set

202

Selecting, from each candidate-word information group in the candidate-word information group set, candidate-word information that meets a target condition as target-word information, to obtain a target-word information set

203

For each piece of target-word information in the target-word information set, in response to determining that the target-word information meets a convergence condition, splicing, on the basis of a preset-word list, the target-word information with a historical target-word information sequence corresponding to the target-word information, to generate a target text

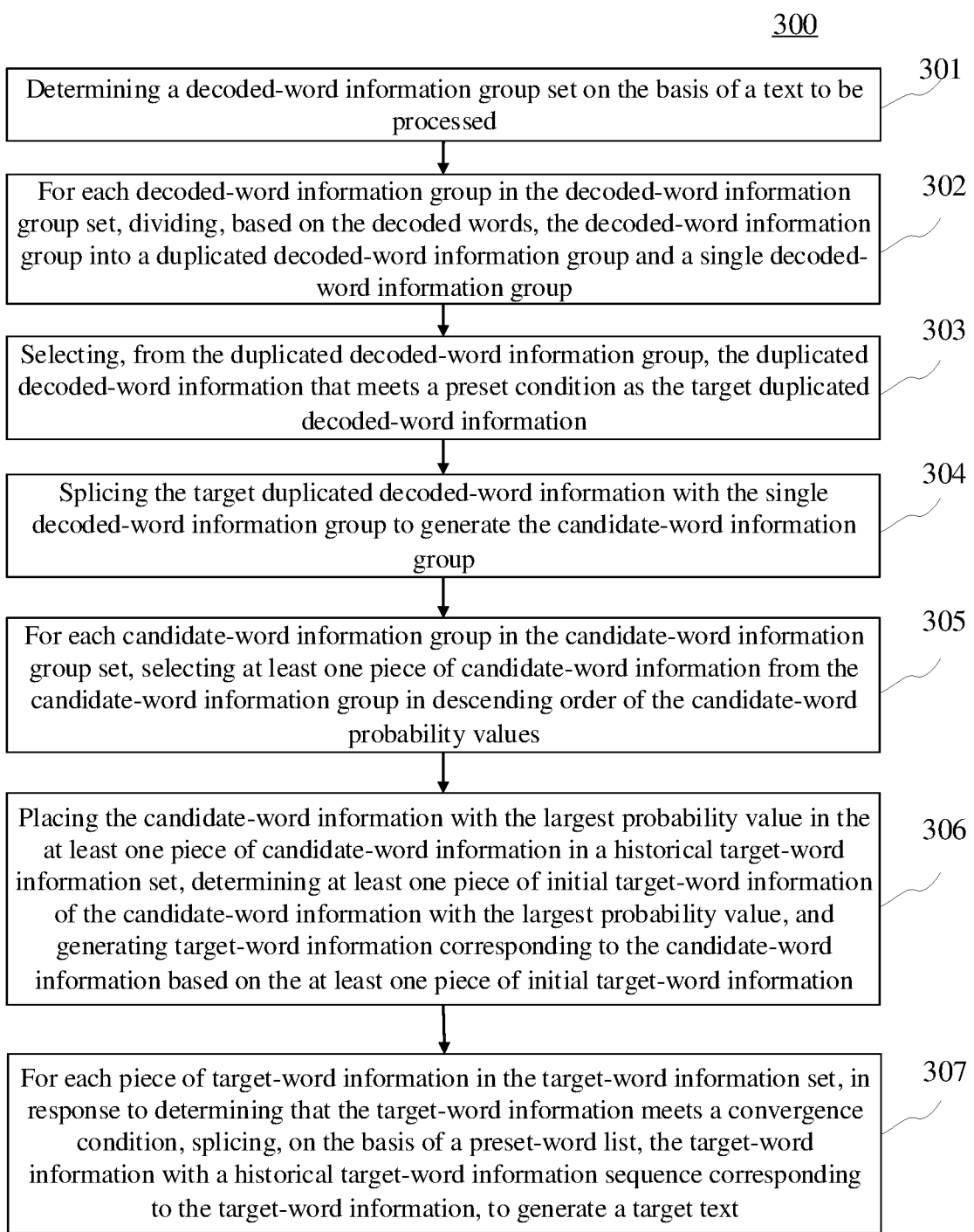

300

301

Determining a decoded-word information group set on the basis of a text to be processed

302

For each decoded-word information group in the decoded-word information group set, dividing, based on the decoded words, the decoded-word information group into a duplicated decoded-word information group and a single decoded-word information group

303

Selecting, from the duplicated decoded-word information group, the duplicated decoded-word information that meets a preset condition as the target duplicated decoded-word information

304

Splicing the target duplicated decoded-word information with the single decoded-word information group to generate the candidate-word information group

305

For each candidate-word information group in the candidate-word information group set, selecting at least one piece of candidate-word information from the candidate-word information group in descending order of the candidate-word probability values

306

Placing the candidate-word information with the largest probability value in the at least one piece of candidate-word information in a historical target-word information set, determining at least one piece of initial target-word information of the candidate-word information with the largest probability value, and generating target-word information corresponding to the candidate-word information based on the at least one piece of initial target-word information

307

For each piece of target-word information in the target-word information set, in response to determining that the target-word information meets a convergence condition, splicing, on the basis of a preset-word list, the target-word information with a historical target-word information sequence corresponding to the target-word information, to generate a target text

TEXT GENERATION INCLUDING DE-DUPLICATION OF DECODED WORD INFORMATION TO SPLICE TARGET WORD INFORMATION INTO AN INFORMATION SEQUENCE

CROSS-REFERENCE TO RELATED APPLICATIONS

This Application is a national stage application of PCT/CN2021/139098. This application claims priorities from PCT Application No. PCT/CN2021/139098, filed Dec. 17, 2021, and from the Chinese patent application 202110053835.3 filed Jan. 15, 2021, the content of which are incorporated herein in the entirety by reference.

TECHNICAL FIELD

The embodiments of the present disclosure relate to the field of computer technology, and specifically relate to a text generation method and apparatus, an electronic device and a computer-readable medium.

BACKGROUND

With the rapid development of computer technology and deep learning technology, significant breakthroughs have been made in various research directions of natural language processing, such as machine translation and text generation (e.g., generating abstracts). In the decoding process, existing text generative models usually use the Beam Search algorithm to greedily seek solutions in a fairly large solution space. This algorithm is a commonly used one in the decoding module of a text generative model.

However, when generating text by the above means, there are often the following technical issues:

The existing bundle search has rather low efficiency and accuracy in generating text themes during the decoding process.

SUMMARY

The content of the present disclosure is to briefly introduce the concepts, which will be described in detail in the mode of carrying out the invention later. The content of present disclosure is not intended to identify key or essential features of the claimed technical solution, nor is it intended to limit the scope of the claimed technical solution. Some embodiments of present disclosure propose a text generation method and apparatus, an electronic device and a computer-readable medium to solve one or more of the technical problems mentioned in the background of the invention above.

In the first aspect, some embodiments of the present disclosure provide a text generation method, which comprises: determining a decoded-word information group set on the basis of a text to be processed, wherein the text to be processed is used for describing a specified object; de-duplicating the decoded-word information group set to generate a candidate-word information group set; selecting, from each candidate-word information group in the candidate-word information group set, candidate-word information that meets a target condition as target-word information, to obtain a target-word information set; for each piece of target-word information in the target-word information set, in response to determining that the target-word information meets a convergence condition, splicing, on the basis of a preset-word list, the target-word information with a historical target-word information sequence corresponding to the target-word information, to generate a target text.

Optionally, the determining a decoded-word information group set on the basis of a text to be processed includes: inputting the text to be processed into a text encoder to generate an encoding hidden layer vector; inputting the encoding hidden layer vector into a decoder to generate a decoded-word information group set.

Optionally, the decoded-word information in the decoded-word information group set includes: decoded words and decoded-word probability values corresponding to the decoded words; and the de-duplicating the decoded-word information group set to generate a candidate-word information group set includes: for each decoded-word information group in the decoded-word information group set, dividing, based on the decoded words, the decoded-word information group into a duplicated decoded-word information group and a single decoded-word information group; selecting, from the duplicated decoded-word information group, duplicated decoded-word information that meets a preset condition as target duplicated decoded-word information; splicing the target duplicated decoded-word information with the single decoded-word information group to generate the candidate-word information group.

Optionally, the for each decoded-word information group in the decoded-word information group set, dividing, based on the decoded words, the decoded-word information group into a duplicated decoded-word information group and a single decoded-word information group includes: for each decoded-word information group in the decoded-word information group set, in response to the decoded-word information group having other decoded-word information containing decoded words of the said decoded-word information, placing the decoded-word information and the other decoded-word information in the duplicated decoded-word information group; otherwise, placing the decoded-word information in the single decoded-word information group.

Optionally, the candidate-word information in the candidate-word information group set includes: candidate words and candidate-word probability values corresponding to the candidate words; and the selecting, from each candidate-word information group in the candidate-word information group set, candidate-word information that meets a target condition as target-word information includes: for each candidate-word information group in the candidate-word information group set, selecting at least one piece of candidate-word information from the candidate-word information group in descending order of the candidate-word probability values; placing candidate-word information with a largest probability value in the at least one piece of candidate-word information, in the historical target-word information set, determining at least one piece of initial target-word information of the candidate-word information with the largest probability value, and generating target-word information corresponding to the candidate-word information based on the at least one piece of initial target-word information. The initial target-word information in the at least one piece of initial target-word information includes: initial target words and initial target-word probability values corresponding to the initial target words.

Optionally, the generating target-word information corresponding to the candidate-word information based on the at least one piece of initial target-word information includes: in response to the initial target word corresponding to the initial target-word information with the largest initial target-word probability value belonging to the historical target-word information set, determining a duplicated-word probability difference between the initial target-word information with the largest initial target-word probability value and the historical target-word information corresponding to the historical target-word information set; in response to the duplicated-word probability difference being greater than the initial target-word probability value of other initial target-word information corresponding to the candidate-word information, setting the initial target-word information with the largest initial target-word probability value as the target-word information, and placing the target-word information in the historical target-word information set.

Optionally, the generating target-word information corresponding to the candidate-word information based on the at least one piece of initial target-word information includes: in response to the initial target word corresponding to the initial target-word information with the largest initial target-word probability value belonging to the historical target-word information set, determining a duplicated-word probability difference between the initial target-word information with the largest initial target-word probability value and the historical target-word information corresponding to the historical target-word information set; in response to the duplicated-word probability difference being less than or equal to the initial target-word probability value of other initial target-word information corresponding to the candidate-word information, setting the initial target-word information with the largest initial target-word probability value in other initial target-word information as the target-word information, and placing the target-word information in the historical target-word information set.

Optionally, the generating target-word information corresponding to the candidate-word information based on the at least one piece of initial target-word information includes: in response to the initial target word corresponding to the initial target-word information with the largest initial target-word probability value not belonging to the historical target-word information set, setting the initial target-word information with the largest initial target-word probability value as the target-word information, and placing the target-word information in the historical target-word information set.

Optionally, the for each piece of target-word information in the target-word information set, in response to determining that the target-word information meets a convergence condition, splicing, on the basis of a preset-word list, the target-word information with a historical target-word information sequence corresponding to the target-word information, to generate a target text includes: for each piece of target-word information in the target-word information set, in response to determining that the target-word information meets a preset convergence condition, splicing the target-word information with a historical target-word information sequence corresponding to the target-word information, to generate a spliced text; selecting, from the preset-word list, the words matching the spliced text as conjunctions; combining the conjunctions with the spliced text to generate thea target text.

In the second aspect, some embodiments of the present disclosure provide a text generation apparatus, which comprises: a determination unit, which is configured to determine a decoded-word information group set on the basis of a text to be processed, wherein the text to be processed is used for describing a specified object; a de-duplicating unit, which is configured to de-duplicate the decoded-word information group set to generate a candidate-word information group set; a selecting unit, which is configured to select, from each candidate-word information group in the candidate-word information group set, candidate-word information that meets a target condition as target-word information, to obtain a target-word information set; a splicing unit, which is configured, for each piece of target-word information in the target-word information set, in response to determining that the target-word information meets a convergence condition, to splice, on the basis of a preset-word list, the target-word information with a historical target-word information sequence corresponding to the target-word information, to generate a target text.

Optionally, the determination unit is further configured to: input the text to be processed into a text encoder to generate an encoding hidden layer vector; input the encoding hidden layer vector into a decoder to generate a decoded-word information group set.

Optionally, the decoded-word information in the decoded-word information group set includes: decoded words and decoded-word probability values corresponding to the decoded words; and the de-duplicating unit is further configured to: for each decoded-word information group in the decoded-word information group set, divide, based on the decoded words, the decoded-word information group into a duplicated decoded-word information group and a single decoded-word information group; select, from the duplicated decoded-word information group, the duplicated decoded-word information that meets a preset condition as the target duplicated decoded-word information; splice the target duplicated decoded-word information with the single decoded-word information group to generate the candidate-word information group.

Optionally, the de-duplicating unit is further configured to: for each decoded-word information group in the decoded-word information group set, in response to the decoded-word information group having other decoded-word information containing decoded words of the said decoded-word information, place the decoded-word information and the other decoded-word information in the duplicated decoded-word information group; otherwise, place the decoded-word information in the single decoded-word information group.

Optionally, the candidate-word information in the candidate-word information group set includes: candidate words and candidate-word probability values corresponding to the candidate words; and the selecting unit is further configured to: for each candidate-word information group in the candidate-word information group set, select at least one piece of candidate-word information from the candidate-word information group in descending order of the candidate-word probability values; place the candidate-word information with the largest probability value in the above at least one piece of candidate-word information in a historical target-word information set, determine at least one piece of initial target-word information of the candidate-word information with the largest probability value, and generate target-word information corresponding to the candidate-word information based on the at least one piece of initial target-word information. The initial target-word information in the at least one piece of initial target-word information includes: initial target words and initial target-word probability values corresponding to the initial target words.

Optionally, the selecting unit is further configured to: in response to the initial target word corresponding to the initial target-word information with the largest initial target-word probability value belonging to the historical target-word information set, determine the duplicated-word probability difference between the initial target-word information with the largest initial target-word probability value and the historical target-word information corresponding to the historical target-word information set; in response to the duplicated-word probability difference being greater than the initial target-word probability value of other initial target-word information corresponding to the candidate-word information, set the initial target-word information with the largest initial target-word probability value as the target-word information, and place the target-word information in the historical target-word information set.

Optionally, the selecting unit is further configured to: in response to the initial target word corresponding to the initial target-word information with the largest initial target-word probability value belonging to the historical target-word information set, determine the duplicated-word probability difference between the initial target-word information with the largest initial target-word probability value and the historical target-word information corresponding to the historical target-word information set; in response to the duplicated-word probability difference being less than or equal to the initial target-word probability value of other initial target-word information corresponding to the candidate-word information, set the initial target-word information with the largest initial target-word probability value in other initial target-word information as the target-word information, and place the target-word information in the historical target-word information set.

Optionally, the selecting unit is further configured to: in response to the initial target word corresponding to the initial target-word information with the largest initial target-word probability value not belonging to the historical target-word information set, set the initial target-word information with the largest initial target-word probability value as the target-word information, and place the target-word information in the historical target-word information set.

Optionally, the splicing unit is further configured to: for each piece of target-word information in the target-word information set, in response to determining that the target-word information meets a preset convergence condition, splice the target-word information with a historical target-word information sequence corresponding to the target-word information, to generate a spliced text; select, from the preset-word list, the words matching the spliced text as conjunctions; combine the conjunctions with the spliced text to generate the target text.

In the third aspect, some embodiments of the present disclosure provide an electronic device, comprising: one or more processors; a storage apparatus on which one or more programs are stored, and when one or more programs are executed by one or more processors, one or more processors implement the method described in any of the embodiments of the first aspect above.

In the fourth aspect, some embodiments of the present disclosure provide a computer-readable medium on which a computer program is stored, wherein the method described in any of the embodiments of the first aspect is implemented when the program is executed by a processor.

The above embodiments of the present disclosure have the following beneficial effects: the text generation method of some embodiments of the present disclosure improves the efficiency and accuracy of generating text themes. To be specific, the reason for the rather low efficiency and accuracy of generating text themes is that: the same duplicated text is not de-duplicated and the corresponding duplicated information of the duplicated text is involved in subsequent calculations, leading to a fairly large number of duplicated texts in the generated text, and resulting in rather low efficiency and accuracy of generating text themes. Based on this, some embodiments of the present disclosure provide a text generation method which, first of all, determines a decoded-word information group set on the basis of a text to be processed, whereby the generated decoded-word information group set provides data support for subsequent text deduplication and target text generation. Secondly, the method de-duplicates the decoded-word information group set to generate a candidate-word information group set. Due to the fact that each decoded-word information group in the decoded-word information group set often contains decoded-word information with the same decoded word, the efficiency of generating text themes is improved by de-duplication of the decoded-word information with the same decoded word. Thirdly, the method selects, from each candidate-word information group in the candidate-word information group set, the candidate-word information that meets a target condition as the target-word information, to obtain a target-word information set; and chooses the target-word information set that can attract fairly strong attention from the candidate-word information group set. Lastly, for each piece of target-word information in the target-word information set, in response to determining that the target-word information meets a convergence condition, the method splices, on the basis of a preset-word list, the target-word information with a historical target-word information sequence corresponding to the target-word information, to generate a target text. The preset-word list is a word list composed of spoken vocabulary. The preset-word list is combined with the target-word information set, which has relatively high attention and fluency at the same time, thus improving the accuracy of generating text themes.

BRIEF DESCRIPTION OF THE DRAWINGS

The above and other features, advantages, and aspects of the embodiments of the present disclosure will become more apparent in conjunction with the accompanying drawings and with reference to the following specific implementations. Throughout the drawings, the same or similar reference signs indicate the same or similar elements. It should be understood that the drawings are schematic, and the components and elements are not necessarily drawn to scale.

FIG. 2 is a flowchart of some embodiments of the text generation method according to the present disclosure;

FIG. 3 is a flowchart of other embodiments of the text generation method according to the present disclosure;

DETAILED DESCRIPTION OF EMBODIES

Figure 1:
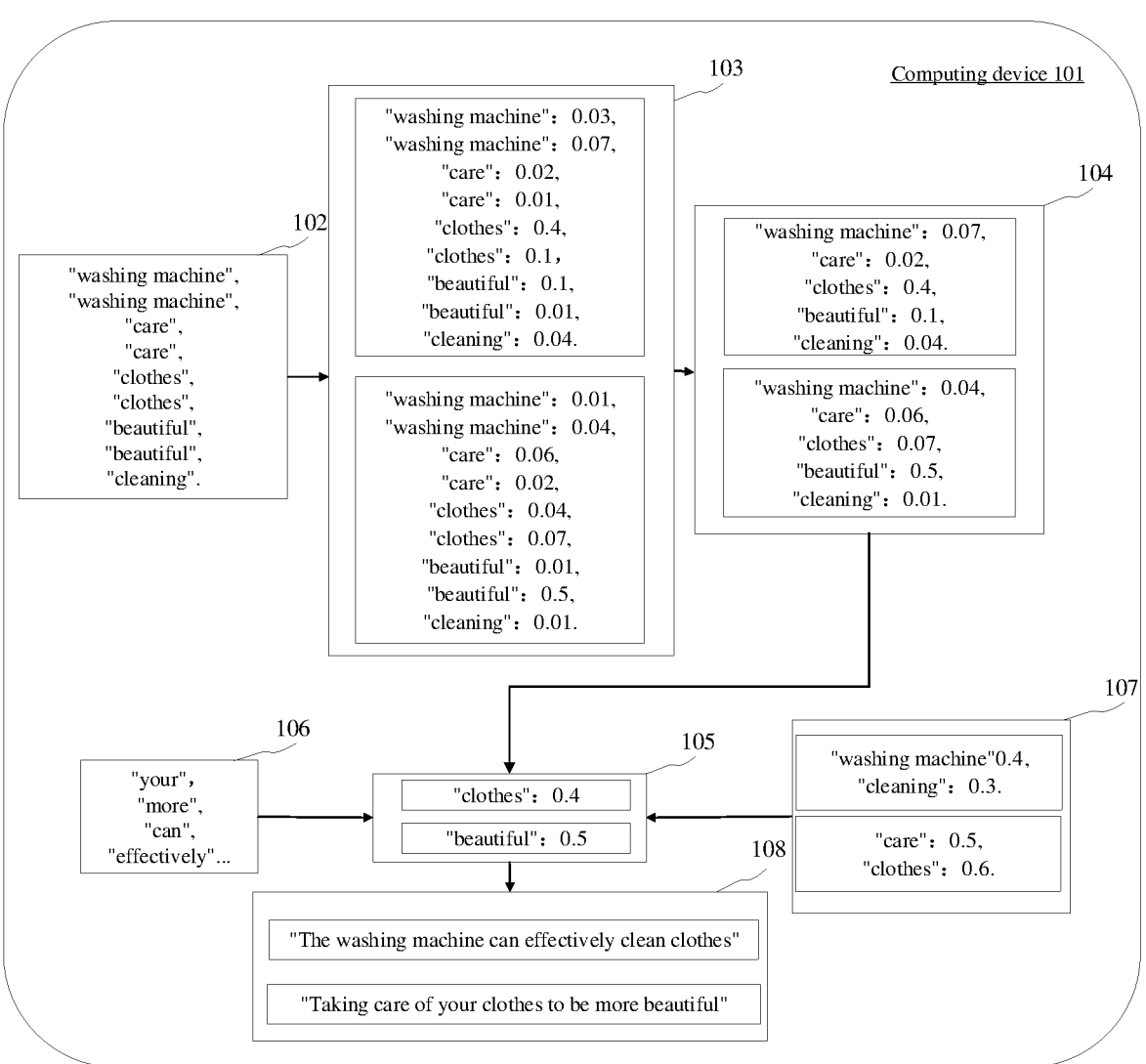
FIG. 1 is an application scenario diagram of the text generation method according to some embodiments of the present disclosure.

Hereinafter, the embodiments of the present disclosure will be described in more detail with reference to the accompanying drawings. Although certain embodiments of the present disclosure are shown in the drawings, it should be understood that the present disclosure may be implemented in various forms, and shall not be construed as being limited to the embodiments set forth herein. On the contrary, these embodiments are provided for a more thorough and complete understanding of the present disclosure. It should be understood that the drawings and embodiments of the present disclosure are used only for illustrative purposes, not to limit the protection scope of the present disclosure.

Besides, it should be noted that, for ease of description, only the portions related to the relevant invention are shown in the drawings. In the case of no conflict, the embodiments in the present disclosure and the features in the embodiments may be combined with each other.

It should be noted that concepts such as "first" and "second" mentioned in the present disclosure are only used to distinguish different devices, modules or units, and are not used to limit the order of functions performed by these devices, modules or units or interdependence thereof.

It should be noted that such adjuncts as "one" and "more" mentioned in the present disclosure are illustrative, not restrictive, and those skilled in the art should understand that, unless the context clearly indicates otherwise, they should be understood as "one or more".

The names of messages or information exchanged between multiple devices in the embodiments of the present disclosure are only for illustrative purposes, and are not intended to limit the scope of these messages or information.

The present disclosure will be described in detail below with reference to the accompanying drawings and in conjunction with embodiments.

FIG. 1 is an application scenario diagram of the text generation method according to some embodiments of the present disclosure.

In the application scenario of FIG. 1, firstly, a computing device 101 determines a decoded-word information group set 103 (for example: ["washing machine": 0.03, "washing machine": 0.07, "care": 0.02, "care": 0.01, "clothes": 0.4, "clothes": 0.1, "beautiful": 0.1, "beautiful": 0.01, "cleaning": 0.04], ["washing machine": 0.01, "washing machine": 0.04, "care": 0.06, "care": 0.02, "clothes": 0.04, "clothes": 0.07, "beautiful": 0.01, "beautiful": 0.5, "cleaning": 0.01]) on the basis of a text to be processed 102 (for example: "washing machine", "washing machine", "care", "care", "clothes", "clothes", "beautiful", "beautiful", "cleaning"). The text to be processed 102 is used to describe a specified object. Then, the computing device 101 may de-duplicate the decoded-word information group set 103 to generate a candidate-word information group set 104 (for example: ["washing machine": 0.07, "care": 0.02, "clothes": 0.4, "beautiful": 0.1, "cleaning": 0.04], ["washing machine": 0.04, "care": 0.06, "clothes": 0.07, "beautiful": 0.5, "cleaning": 0.01]). Thereafter, the computing device 101 may select, from each candidate-word information group in the candidate-word information group set 104, the candidate-word information that meets a target condition as the target-word information, to obtain a target-word information set 105 (for example: "clothes": 0.4, "beautiful": 0.5). In the end, the computing device 101 may, for each piece of target-word information in the target-word information set 105, in response to determining that the target-word information meets a convergence condition, splice, on the basis of a preset-word list 106 (for example, "your", "more", "can", "effectively" . . . ), the target-word information with a historical target-word information sequence 107 (for example: ["washing machine": 0.4, "cleaning": 0.3], ["care": 0.5, "clothes": 0.6]) corresponding to the target-word information, to generate a target text 108 (for example:

["the washing machine can effectively clean clothes"], ["taking care of your clothes to be more beautiful"]).

It should be noted that the computing device 101 may be hardware or software. When the computing device is hardware, it may be implemented as a distributed cluster composed of multiple servers or terminal devices, or as a single server or terminal device. When embodied as software, the computing device may be installed in the hardware devices listed above. It may be implemented as multiple software or software modules for example used to provide distributed services, or as a single software or software module. No specific limitations are given here.

It should be understood that the number of computing devices in FIG. 1 is only illustrative. According to the needs of implementation, there may be any number of computing devices.

FIG. 2 illustrates a process 200 of some embodiments of the text generation method according to the present disclosure. This text generation method comprises the following steps:

Step 201, determining a decoded-word information group set on the basis of a text to be processed.

In some embodiments, the executing body of the text generation method (such as the computing device 101 shown in FIG. 1) may determine a decoded-word information group set on the basis of a text to be processed, wherein the text to be processed may be a text waiting to be processed. The text to be processed may be a vocabulary used to describe a specified object. The decoded-word information group set may be a decoded-word information group set at any time step in each time step generated by inputting the pre-processed text into a pre-trained text generation model. The pre-trained text generation model may be a Seq2Seq (Sequence to Sequence) model. The pre-trained text generation model may also be a SeqGAN (Sequence Generative Adversarial Nets with Policy Gradient) model. The decoded-word information in the decoded-word information set may include: decoded words and decoded-word probabilities corresponding to the decoded words.

As an example, the text to be processed may be ["washing machine", "washing machine", "care", "care", "clothes", "clothes", "beautiful", "beautiful", "cleaning"]. Inputting the text to be processed into the pre-trained text generation model, the generated decoded-word information group set may be [["washing machine": 0.03, "washing machine": 0.07, "care": 0.02, "care": 0.01, "clothes": 0.4, "clothes": 0.1, "beautiful": 0.1, "beautiful": 0.01, "cleaning": 0.04], ["washing machine": 0.01, "washing machine": 0.04, "care": 0.06, "care": 0.02, "clothes": 0.04, "clothes": 0.07, "beautiful": 0.01, "beautiful": 0.5, "cleaning": 0.01]].

Step 202 comprises de-duplicating the decoded-word information group set to generate a candidate-word information group set.

In some embodiments, the executing body of the text generation method de-duplicates the decoded-word information group set to generate a candidate-word information group set. Based on the decoded words mentioned above, for each decoded-word information group in the decoded-word information group set, the decoded-word information with the same decoded word in the decoded-word information group is de-duplicated, retaining only the decoded-word information with the largest probability value in the same decoded-word information, and the decoded-word information that does not have the same decoded word is combined with the decoded-word information that retains the largest probability value in the same decoded-word information, to generate a candidate-word information group.

As an example, the decoded-word information group set mentioned above may be [["washing machine": 0.03, "washing machine": 0.07, "care": 0.02, "care": 0.01, "clothes": 0.4, "clothes": 0.1, "beautiful": 0.1, "beautiful": 0.01, "cleaning": 0.04], ["washing machine": 0.01, "washing machine": 0.04, "care: 0.06, "care: 0.02, "clothes": 0.04, "clothes": 0.07, "beautiful": 0.01, "beautiful": 0.5, "cleaning": 0.01]]. The above de-duplicating the decoded-word information group set to generate a candidate-word information group set may be ["washing machine": 0.07, "care": 0.02, "clothes": 0.4, "beautiful": 0.1, "cleaning": 0.04], ["washing machine": 0.04, "care": 0.06, "clothes": 0.07, "beautiful": 0.5, "cleaning": 0.01]].

Step 203 comprises selecting, from each candidate-word information group in the candidate-word information group set, the candidate-word information that meets a target condition as the target-word information, to obtain a target-word information set.

In some embodiments, the executing body of the above text generation method may select, from each candidate-word information group in the candidate-word information group set, the candidate-word information that meets a target condition as the target-word information, to obtain a target-word information set. The target condition may be that the candidate information may be the candidate-word information with the largest probability value in the candidate-word information group mentioned above.

As an example, the candidate-word information group set mentioned above may be ["washing machine": 0.07, "care": 0.02, "clothes": 0.4, "beautiful": 0.1, "cleaning": 0.04], ["washing machine": 0.04, "care": 0.06, "clothes": 0.07, "beautiful": 0.5, "cleaning": 0.01]]. Then selecting, from each candidate-word information group in the candidate-word information group set, the candidate-word information that meets a target condition as the target-word information, to obtain a target-word information set may be ["clothes": 0.4], ["beautiful": 0.5]].

Step 204 comprises, for each piece of target-word information in the target-word information set, in response to determining that the target-word information meets a convergence condition, splicing, on the basis of a preset-word list, the target-word information with a historical target-word information sequence corresponding to the target-word information, to generate a target text.

In some embodiments, the executing body of the above text generation method may, for each piece of target-word information in the target-word information set, in response to determining that the target-word information meets a convergence condition, splice the target words corresponding to the target-word information with a historical target-word sequence corresponding to the historical target-word information sequence corresponding to the target-word information, to generate a spliced text, and determine the words in the preset-word list that match the spliced text mentioned above, then combine the matched words with the spliced text to generate a target text. The target-word information meeting the convergence condition may be the above target-word information being the target-word information corresponding to the last time step of the preset time step. The preset-word list may be a word list composed of spoken vocabulary. The historical target-word information in the historical target-word information sequence may be the historical target-word information generated for each time step in the preset time step corresponding to the above target-word information.

As an example, the target-word information set may be [["clothes": 0.4], ["beautiful": 0.5]]. It is possible to, for each piece of target-word information in the target-word information set, respond to determining the target-word information being the target-word information corresponding to the last time step of the preset time step. The preset time step may be 3. The target-word information may be ["clothes": 0.4]. The historical target-word information sequence corresponding to the target-word information may be ["washing machine": 0.4], ["cleaning": 0.3]]. The target-word information may be ["beautiful": 0.5]. The historical target-word information sequence corresponding to the target-word information may be [["care": 0.5], ["clothes": 0.6]]. The preset-word list may be ["your", "more", "can", "effectively"]. The target text set generated after the final text splicing may be [["the washing machine can effectively clean clothes"], ["taking care of your clothes to be more beautiful"]].

The above embodiments of the present disclosure have the following beneficial effects: the text generation method of some embodiments of the present disclosure improves the efficiency and accuracy of generating text themes. To be specific, the reason for the rather low efficiency and accuracy of generating text themes is that: the same duplicated text is not de-duplicated and the corresponding duplicated information of the duplicated text is involved in subsequent calculations, leading to a fairly large number of duplicated texts in the generated text, and resulting in rather low efficiency and accuracy of generating text themes. Based on this, some embodiments of the present disclosure provide a text generation method which, first of all, determines a decoded-word information group set on the basis of a text to be processed, whereby the generated decoded-word information group set provides data support for subsequent text deduplication and target text generation. Secondly, the method de-duplicates the decoded-word information group set to generate a candidate-word information group set. Due to the fact that each decoded-word information group in the decoded-word information group set often contains decoded-word information with the same decoded word, the efficiency of generating text themes is improved by deduplication of the decoded-word information with the same decoded word. Thirdly, the method selects, from each candidate-word information group in the candidate-word information group set, the candidate-word information that meets a target condition as the target-word information, to obtain a target-word information set; and chooses the target-word information set that can attract fairly strong attention from the candidate-word information group set. Lastly, for each piece of target-word information in the target-word information set, in response to determining that the target-word information meets a convergence condition, the method splices, on the basis of a preset-word list, the target-word information with a historical target-word information sequence corresponding to the target-word information, to generate a target text. The preset-word list is a word list composed of spoken vocabulary. The preset-word list is combined with the target-word information set, which has relatively high attention and fluency at the same time, thus improving the accuracy of generating text themes.

FIG. 3 illustrate a process 300 of other embodiments of the text generation method according to the present disclosure. The text generation method comprises the following steps:

Step 301 comprises determining a decoded-word information group set on the basis of a text to be processed.

In some embodiments, the above executing body determines a decoded-word information group set on the basis of a text to be processed, which may include the following steps:

The first step is inputting the text to be processed into a text encoder to generate an encoding hidden layer vector.

In some embodiments, the above executing body may input the text to be processed into a text encoder to generate an encoding hidden layer vector. The text encoder may be used to compress the text to be processed into a low latitude text vector. The encoding hidden layer vector may be a word vector after feature compression. The text encoder may be an encoder composed of various types of neural network models. The text encoder may be an auto-encoder. The text encoder may also be an encoder in the seq2seq (Sequence to Sequence) model.

The second step is inputting the encoding hidden layer vector into a decoder to generate a decoded-word information group set.

In some embodiments, the above executing body may input the encoding hidden layer vector into a decoder to generate a decoded-word information group set. The decoder may be used to input the encoding hidden layer vector into a pre-trained neural network model for word decoding to generate a decoded-word information group set. The pre-trained neural network model may be RNN (Recurrent Neural Network). The pre-trained neural network model may also be CNNs (Convolutional Neural Networks). The decoded-word information in the decoded-word information group set may include decoded words and the decoded-word probability corresponding to the decoded words.

As an example, the text to be processed may be ["washing machine", "washing machine", "care", "care", "clothes", "clothes", "beautiful", "beautiful", "cleaning"]. The decoded-word information group set generated above may be ["washing machine": 0.03, "washing machine": 0.07, "care": 0.02, "care": 0.01, "clothes": 0.04, "clothes": 0.01, "beautiful": 0.1, "beautiful": 0.01, "cleaning": 0.4], ["washing machine": 0.01, "washing machine": 0.04, "care": 0.06, "care": 0.02, "clothes": 0.4, "clothes": 0.07, "beautiful": 0.01, "beautiful": 0.05, "cleaning": 0.04]].

Step 302 comprises, for each decoded-word information group in the decoded-word information group set, dividing, based on the decoded words, the decoded-word information group into a duplicated decoded-word information group and a single decoded-word information group.

In some embodiments, the above executing body may, for each decoded-word information group in the decoded-word information group set, in response to the decoded-word information group having other decoded-word information containing decoded words of the said decoded-word information, place the decoded-word information and the other decoded-word information in the duplicated decoded-word information group; otherwise, place the decoded-word information in the single decoded-word information group. The duplicated decoded-word information in the duplicated decoded-word information group may be decoded-word information with the same decoded word. The single decoded-word information in the single decoded-word information group may be decoded-word information that does not have the same decoded word.

As an example, the decoded-word information group set generated above may be ["washing machine": 0.03, "washing machine": 0.07, "care": 0.02, "care": 0.01, "clothes": 0.04, "clothes": 0.01, "beautiful": 0.1, "beautiful": 0.01, "cleaning": 0.4], ["washing machine": 0.01, "washing machine": 0.04, "care": 0.06, "care": 0.02, "clothes": 0.4, "clothes": 0.07, "beautiful": 0.01, "beautiful": 0.05, "cleaning": 0.04]].

For one piece of decoded-word information in the decoded-word information group set: ["washing machine": 0.03, "washing machine": 0.07, "care": 0.02, "care": 0.01, "clothes": 0.04, "clothes": 0.01, "beautiful": 0.1, "beautiful": 0.01, "cleaning": 0.4], the corresponding duplicated decoded-word information group and single decoded-word information group may be [["washing machine": 0.03, "washing machine": 0.07], ["care": 0.02, "care": 0.01], ["clothes": 0.04, "clothes": 0.01], ["beautiful": 0.1, "beautiful": 0.01]] and ["cleaning": 0.4], respectively.

As another example, the decoded-word information group set generated above may be ["washing machine": 0.03, "washing machine": 0.07, "care": 0.02, "care": 0.01, "clothes": 0.04, "clothes": 0.01, "beautiful": 0.1, "beautiful": 0.01, "cleaning": 0.4], ["washing machine": 0.01, "washing machine": 0.04, "care": 0.06, "care": 0.02, "clothes": 0.4, "clothes": 0.07, "beautiful": 0.01, "beautiful": 0.05, "cleaning": 0.04]].

For another piece of decoded-word information in the decoded-word information group set: ["washing machine": 0.01, "washing machine": 0.04, "care": 0.06, "care": 0.02, "clothes": 0.4, "clothes": 0.07, "beautiful": 0.01, "beautiful": 0.05, "cleaning": 0.04]], the corresponding duplicated decoded-word information group and single decoded-word information group may be [["washing machine": 0.01, "washing machine": 0.04], ["care": 0.06, "care": 0.02], ["clothes": 0.4, "clothes": 0.07], ["beautiful": 0.01, "beautiful": 0.05]] and ["cleaning: 0.04"], respectively.

Step 303 comprises selecting, from the duplicated decoded-word information group, the duplicated decoded-word information that meets a preset condition as the target duplicated decoded-word information.

In some embodiments, the above executing body may select, from the duplicated decoded-word information group, the duplicated decoded-word information that meets a preset condition as the target duplicated decoded-word information. The preset condition may be that the duplicated decoded-word information is the duplicated decoded-word information with the largest decoded-word probability value in the duplicated decoded-word information group. For each piece of duplicated decoded-word information in the duplicated decoded-word information group, they are sorted in descending order of the decoded-word probability values to obtain a duplicated decoded-word information sequence, and the duplicated decoded-word information with the largest decoded-word probability value is selected from the duplicated decoded-word information sequence.

As an example, the duplicated decoded-word information group may be ["washing machine": 0.03, "washing machine": 0.07], ["care": 0.02, "care": 0.01], ["clothes": 0.04, "clothes": 0.01], ["beautiful": 0.1, "beautiful": 0.01]]. The generated target duplicated decoded-word information may be ["washing machine": 0.07], ["care": 0.02], ["clothes": 0.04], ["beautiful": 0.1]].

As another example, the duplicated decoded-word information group may be ["washing machine": 0.01, "washing machine": 0.04], ["care": 0.06, "care": 0.02], ["clothes": 0.4, "clothes": 0.07], ["beautiful": 0.01, "beautiful": 0.05]]. The generated target duplicated decoded-word information may be ["washing machine": 0.04], ["care": 0.06], ["clothes": 0.4], ["beautiful": 0.05]].

Step 304 comprises splicing the target duplicated decoded-word information with the single decoded-word information group to generate the candidate-word information group.

In some embodiments, the above executing body may splice the target duplicated decoded-word information with the single decoded-word information group to generate the candidate-word information group. The splicing process may, based on the decoded-word information group, combine the target duplicated decoded-word information with the single decoded-word information group corresponding to the target duplicated decoded-word information to generate a candidate-word information group.

As an example, the target duplicated decoded-word information may be ["washing machine": 0.07], ["care": 0.02], ["clothes": 0.04], ["beautiful": 0.1]]. The single decoded-word information group corresponding to the target duplicated decoded-word information may be ["cleaning": 0.04]. The candidate-word information group generated by combining the two sets of information may be [["washing machine": 0.07], ["care": 0.02], ["clothes": 0.04], ["beautiful": 0.1], ["cleaning": 0.4]].

As another example, the target duplicated decoded-word information may be ["washing machine": 0.04], ["care": 0.06], ["clothes": 0.4], ["beautiful": 0.05]]. The single decoded-word information group corresponding to the target duplicated decoded-word information may be ["cleaning": 0.01]. The candidate-word information group generated by combining the two sets of information may be [["washing machine": 0.04], ["care": 0.06], ["clothes": 0.4], ["beautiful": 0.05], ["cleaning": 0.01]].

Step 305 comprises, for each candidate-word information group in the candidate-word information group set, selecting at least one piece of candidate-word information from the candidate-word information group in descending order of the candidate-word probability values.

In some embodiments, the above executing body may, for each candidate-word information group in the candidate-word information group set, select at least one piece of candidate-word information from the candidate-word information group in descending order of the candidate-word probability values, wherein the candidate-word information includes: candidate words and candidate-word probability values corresponding to the candidate words.

As an example, the candidate-word information group may be ["washing machine": 0.07], ["care": 0.02], ["clothes": 0.04], ["beautiful": 0.1], ["cleaning": 0.4]]. The selecting at least one piece of candidate-word information from the candidate-word information group in descending order of the candidate-word probability values may be ["Beautiful": 0.1, "cleaning": 0.4]. Another candidate-word information group may be ["washing machine": 0.04], ["care": 0.06], ["clothes": 0.4], ["beautiful": 0.05], ["cleaning": 0.01]]. The selecting at least one piece of candidate-word information from the candidate-word information group in descending order of the candidate-word probability values may be ["care": 0.06, "clothes": 0.4].

Step 306 comprises placing the candidate-word information with the largest probability value in the at least one piece of candidate-word information in a historical target-word information set, determining at least one piece of initial target-word information of the candidate-word information with the largest probability value, and generating target-word information corresponding to the candidate-word information based on the at least one piece of initial target-word information.

In some embodiments, the above executing body may first for the candidate-word information in at least one piece of candidate-word information place the candidate-word information with the largest probability value in the at least one piece of candidate-word information in a historical target-word information set; then determine at least one piece of initial target-word information of the candidate-word information with the largest probability value; and in the end, generate target-word information corresponding to the candidate-word information based on the at least one piece of initial target-word information. The initial target-word information in the at least one initial target-word information includes: initial target words and initial target-word probability values corresponding to the initial target words. The initial target-word information with the largest initial target-word probability value is selected from at least one piece of initial target-word information as the target-word information.

Figure 4:
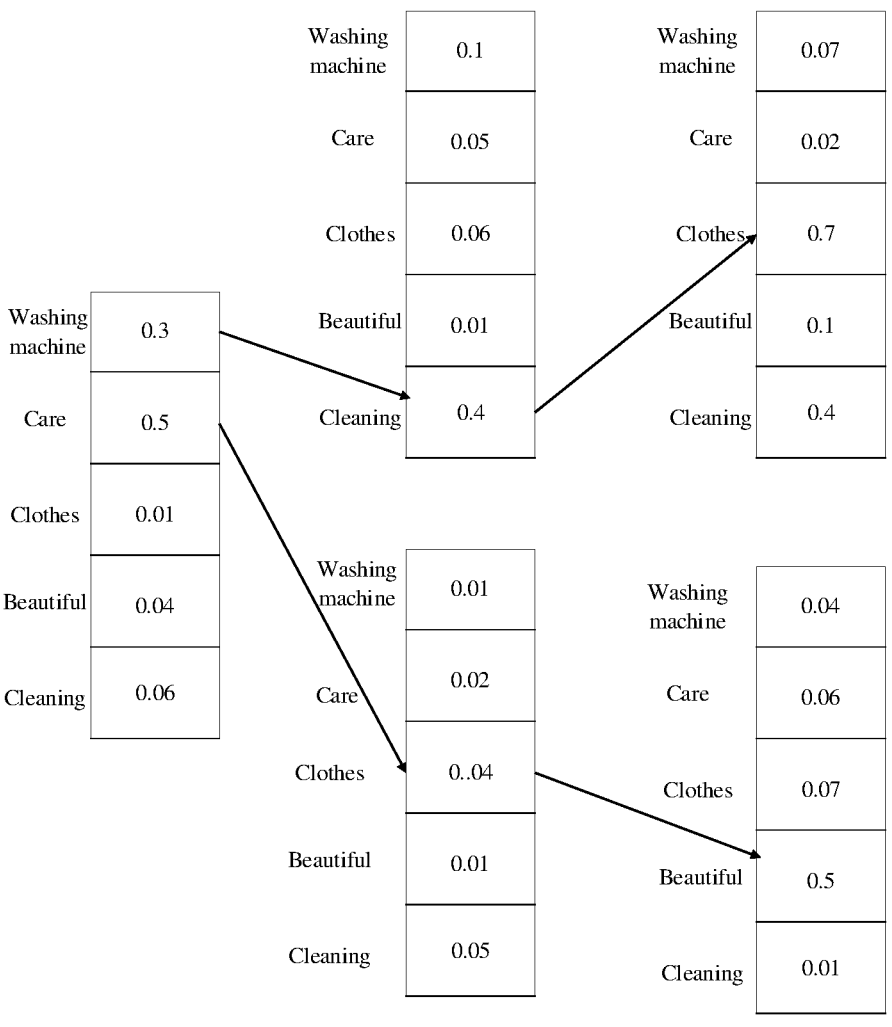
FIG. 4 is an application scenario diagram of other embodiments of the text generation method according to the present disclosure.

As an example, the at least one piece of candidate-word information may be ["beautiful": 0.1, "cleaning": 0.4]. The at least one piece of candidate-word information may also be ["care": 0.06, "clothes": 0.4]. The candidate-word information with the largest probability value may be ["cleaning": 0.4] or ["clothes": 0.4]. The placing the candidate-word information in the historical target-word information set may be ["cleaning": 0.4], ["clothes": 0.4]]. The initial target-word information in the candidate-word information is determined. The candidate-word information may be ["cleaning": 0.4]. The initial target-word information corresponding to the candidate-word information may be ["clothes": 0.7, "beautiful": 0.1], and the generated target-word information corresponding to the candidate-word information may be ["clothes": 0.7]. The candidate-word information may be ["clothes": 0.4], while the initial target-word information corresponding to the candidate-word information may be ["clothes": 0.07, "beautiful": 0.5]. The generated target-word information corresponding to the candidate-word information may be ["beautiful": 0.5]. The specific application scenario for generating target-word information is shown in FIG. 4.

In certain optional implementations of some embodiments, the above executing body first may, in response to the initial target word corresponding to the initial target-word information with the largest initial target-word probability value belonging to the historical target-word information set, determine the duplicated-word probability difference between the initial target-word information with the largest initial target-word probability value and the historical target-word information corresponding to the historical target-word information set; then the above executing body may, in response to the duplicated-word probability difference being greater than the initial target-word probability value of other initial target-word information corresponding to the candidate-word information, set the initial target-word information with the largest initial target-word probability value as the target-word information, and place the target-word information in the historical target-word information set.

As an example, the initial target word corresponding to the initial target-word information with the largest initial target-word probability value may be "clothes". The historical target-word information set may be ["cleaning": 0.4], ["clothes": 0.4]]. The probability value of the initial target word corresponding to the initial target-word information with the largest initial target-word probability value may be 0.7. Then determining the duplicated-word probability difference between the initial target-word information with the largest initial target-word probability value and the historical target-word information corresponding to the historical tar-get-word information set may be 0.3. The other initial target-word information may be ["beautiful": 0.1]. In response to the duplicated-word probability difference being greater than the initial target-word probability value of other initial target-word information corresponding to the candi-date-word information, set the initial target-word informa-tion ["clothes": 0.7] with the largest initial target-word probability value as the target-word information, and place the target-word information in the historical target-word information set ["cleaning": 0.4, "clothes": 0.7].

In certain optional implementations of some embodi-ments, the above executing body first may, in response to the initial target word corresponding to the initial target-word information with the largest initial target-word probability value belonging to the historical target-word information set, determine the duplicated-word probability difference between the initial target-word information with the largest initial target-word probability value and the historical target-word information corresponding to the historical target-word information set; then may, in response to the dupli-cated-word probability difference being less than or equal to the initial target-word probability value of other initial target-word information corresponding to the candidate-word information, set the initial target-word information with the largest initial target-word probability value in other initial target-word information as the target-word informa-tion, and placing the target-word information in the histori-cal target-word information set.

In certain optional implementations of some embodi-ments, the above executing body first in response to the initial target word corresponding to the initial target-word information with the largest initial target-word probability value not belonging to the historical target-word information set, set the initial target-word information with the largest initial target-word probability value as the target-word infor-mation, and place the target-word information in the his-torical target-word information set.

Step 307 comprises, for each piece of target-word infor-mation in the target-word information set, in response to determining that the target-word information meets a con-vergence condition, splicing, on the basis of a preset-word list, the target-word information with a historical target-word information sequence corresponding to the target-word information, to generate a target text.

In some embodiments, the above executing body for each piece of target-word information in the target-word infor-mation set, in response to determining that the target-word information meets a convergence condition, splicing, on the basis of a preset-word list, the target-word information with a historical target-word information sequence corresponding to the target-word information, to generate a target text, may include the following steps:

The first step is, for each piece of target-word information in the target-word information set, in response to determin-ing that the target-word information meets a preset conver-gence condition, splicing the target-word information with a historical target-word information sequence corresponding to the target-word information to generate a target text.

As an example, the target-word information may be ["clothes": 0.7]. The historical target-word information sequence corresponding to the target-word information may be ["washing machine": 0.3, "cleaning": 0.4]. The splicing the target-word information with the historical target-word information sequence corresponding to the target-word information to generate a spliced text may be ["the washing machine washes clothes"].

The second step is selecting, from the preset-word list, the words matching the spliced text as conjunctions.

Various machine learning methods are used to select, from the preset-word list, the words matching the spliced text as conjunctions.

As an example, the preset-word list may be ["your", "can", "effectively"]. The selected conjunctions may be ["can", "effectively"].

The third step is combining the conjunctions with the spliced text to generate a target text.

As an example, the combining the conjunctions with the spliced text to generate a target text may be ["the washing machine can effectively clean clothes"].

Compared to the description of some corresponding embodiments in FIG. 2, FIG. 3 shows a process 300 of the information processing method in some corresponding embodiments. Firstly, determine a decoded-word informa-tion group set on the basis of a text to be processed, whereby the generated decoded-word information group set provides data support for subsequent text deduplication and target text generation. Secondly, de-duplicate the decoded-word information group set to generate a candidate-word infor-mation group set. Due to the fact that each decoded-word information group in the decoded-word information group set often contains decoded-word information with the same decoded word, the efficiency of generating text themes is improved by de-duplication of the decoded-word informa-tion with the same decoded word. Thirdly, select, from each candidate-word information group in the candidate-word information group set, the candidate-word information that meets a target condition as the target-word information, to obtain a target-word information set. Even if the target word corresponding to the target-word information has been decoded before, if the target-word information can attract very strong attention in the current time step, it will still be decoded as the target-word information. Therefore, the gen-erated target-word information is a relatively fluent predic-tive word in real life. Lastly, for each piece of target-word information in the target-word information set, in response to determining that the target-word information meets a convergence condition, splice, on the basis of a preset-word list, the target-word information with a historical target-word information sequence corresponding to the target-word information, to generate a target text. The preset-word list is a word list composed of spoken vocabulary. The preset-word list is combined with the target-word informa-tion set, which has relatively high attention and fluency at the same time, thus improving the accuracy of generating text themes, and the generated target text is characterized by both relatively high attention and fluency.

Figure 5:
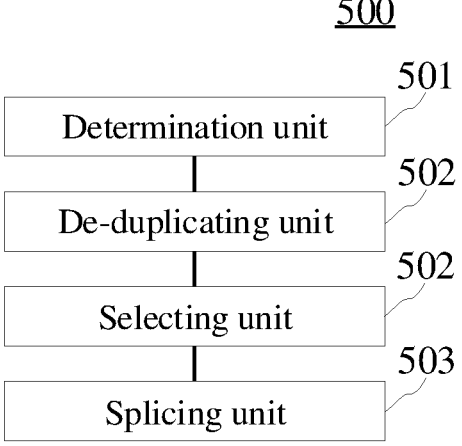
FIG. 5 is a structural diagram of some embodiments of the text generation apparatus according to the present disclosure.

Further referring to FIG. 5, as an implementation of the methods shown in the above figures, the present disclosure provides some embodiments of a text generation apparatus. These embodiments of apparatus correspond to the method embodiments shown in FIG. 2. The apparatus may be specifically applied to various electronic devices.

As shown in FIG. 5, the text generation apparatus 500 of some embodiments comprises: a determination unit 501, which is configured to determine a decoded-word informa-tion group set on the basis of a text to be processed, wherein the text to be processed is used for describing a specified object; a de-duplicating unit 502, which is configured to de-duplicate the decoded-word information group set to generate a candidate-word information group set; a selecting unit 503, which is configured to select, from each candidate-word information group in the candidate-word information group set, the candidate-word information that meets a target condition as the target-word information, to obtain a target-word information set; and a splicing unit 504, which is configured, for each piece of target-word information in the target-word information set, in response to determining that the target-word information meets a convergence condition, to splice, on the basis of a preset-word list, the target-word information with a historical target-word information sequence corresponding to the target-word information, to generate a target text.

It may be understood that the units in the apparatus 500 correspond to the steps in the method described in FIG. 2. Therefore, the operations, features, and beneficial effects described above for the method are also applicable to the apparatus 500 and the units contained therein, and will not be further elaborated here.

In the optional implementations of some embodiments, the determination unit 501 is further configured to: input the text to be processed into a text encoder to generate an encoding hidden layer vector; input the encoding hidden layer vector into a decoder to generate a decoded-word information group set.

In the optional implementations of some embodiments, the decoded-word information in the decoded-word information group set includes: decoded words and decoded-word probability values corresponding to the decoded words; and the de-duplicating unit 502 is further configured to: for each decoded-word information group in the decoded-word information group set, divide, based on the decoded words, the decoded-word information group into a duplicated decoded-word information group and a single decoded-word information group; select, from the duplicated decoded-word information group, the duplicated decoded-word information that meets a preset condition as the target duplicated decoded-word information; splice the target duplicated decoded-word information with the single decoded-word information group to generate the candidate-word information group.

In the optional implementations of some embodiments, the de-duplicating unit 502 is further configured to: for each decoded-word information group in the decoded-word information group set, in response to the decoded-word information group having other decoded-word information containing decoded words of the said decoded-word information, place the decoded-word information and the other decoded-word information in the duplicated decoded-word information group; otherwise, place the decoded-word information in the single decoded-word information group.

In the optional implementations of some embodiments, the candidate-word information in the candidate-word information group set includes: candidate words and candidate-word probability values corresponding to the candidate words; and the selecting unit 503 is further configured to: for each candidate-word information group in the candidate-word information group set, select at least one piece of candidate-word information from the candidate-word information group in descending order of the candidate-word probability values; place the candidate-word information with the largest probability value in the above at least one piece of candidate-word information in a historical target-word information set, determine at least one piece of initial target-word information of the candidate-word information with the largest probability value, and generate target-word information corresponding to the candidate-word information based on the at least one piece of initial target-word information. The initial target-word information in the at least one piece of initial target-word information includes:

initial target words and initial target-word probability values corresponding to the initial target words.

In the optional implementations of some embodiments, the selecting unit 503 is further configured to: in response to the initial target word corresponding to the initial target-word information with the largest initial target-word probability value belonging to the historical target-word information set, determine the duplicated-word probability difference between the initial target-word information with the largest initial target-word probability value and the historical target-word information corresponding to the historical target-word information set; in response to the duplicated-word probability difference being greater than the initial target-word probability value of other initial target-word information corresponding to the candidate-word information, set the initial target-word information with the largest initial target-word probability value as the target-word information, and place the target-word information in the historical target-word information set.

In the optional implementations of some embodiments, the selecting unit 503 is further configured to: in response to the initial target word corresponding to the initial target-word information with the largest initial target-word probability value belonging to the historical target-word information set, determine the duplicated-word probability difference between the initial target-word information with the largest initial target-word probability value and the historical target-word information corresponding to the historical target-word information set; in response to the duplicated-word probability difference being less than or equal to the initial target-word probability value of other initial target-word information corresponding to the candidate-word information, set the initial target-word information with the largest initial target-word probability value in other initial target-word information as the target-word information, and place the target-word information in the historical target-word information set.

In the optional implementations of some embodiments, the selecting unit 503 is further configured to: in response to the initial target word corresponding to the initial target-word information with the largest initial target-word probability value not belonging to the historical target-word information set, set the initial target-word information with the largest initial target-word probability value as the target-word information, and place the target-word information in the historical target-word information set.

In the optional implementations of some embodiments, the splicing unit 504 is further configured to: for each piece of target-word information in the target-word information set, in response to determining that the target-word information meets a preset convergence condition, splice the target-word information with a historical target-word information sequence corresponding to the target-word information, to generate a spliced text; select, from the preset-word list, the words matching the spliced text as conjunctions; combine the conjunctions with the spliced text to generate a target text.

Figure 6:
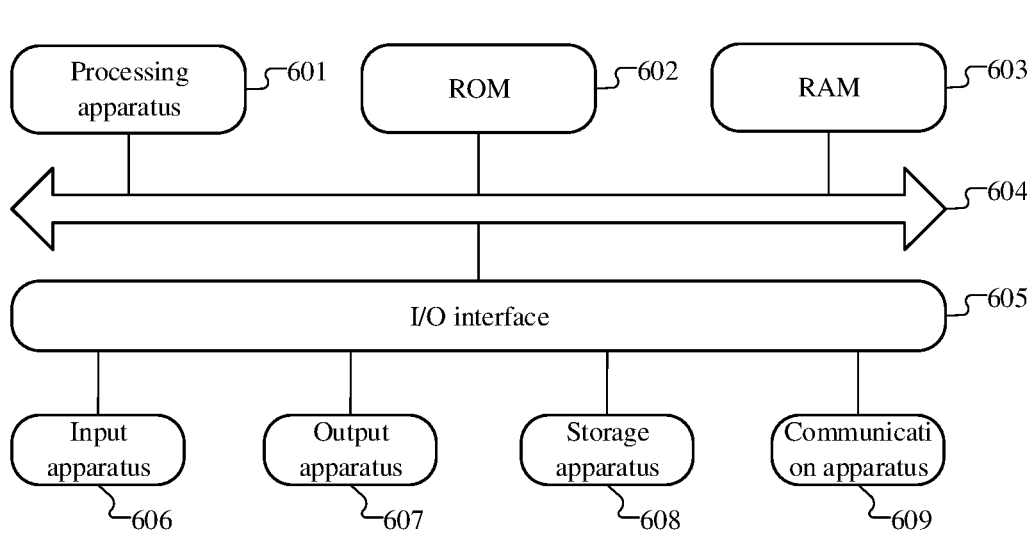
FIG. 6 is a structural diagram of an electronic device suitable for implementing some embodiments of the present disclosure.

In FIG. 6 below, a structural diagram of an electronic device (such as the computing device 101 in FIG. 1) 600 suitable for implementing some embodiments of the present disclosure is shown. The electronic device shown in FIG. 6 is only an example and should not impose any limitations on the functionality and scope of use of the disclosed embodiments.

As shown in FIG. 6, the electronic device 600 may comprise a processing apparatus (such as a central processing unit, graphics processor, etc.) 601, which may perform various appropriate actions and processes based on programs stored in a read-only memory (ROM) 602 or programs loaded from a storage apparatus 608 to a random access memory (RAM) 603. In the RAM 603, various programs and data required for the operation of the electronic device 600 are also stored. The processing apparatus 601, ROM 602, and RAM 603 are connected to each other through a bus 604. An input/output (I/O) interface 605 is also connected to the bus 604.

In general, the following apparatus may be connected to the I/O interface 605: an input apparatus 606 including for example touch screens, touchpads, keyboards, mice, cameras, microphones, accelerometers, gyroscopes, etc.; an output apparatus 607 including for example liquid crystal displays (LCDs), speakers, vibrators, etc.; a storage apparatus 608 including for example magnetic tapes, hard drives, etc.; and a communication apparatus 609. The communication apparatus 609 may allow the electronic device 600 to have wired or wireless communications with other devices to exchange data. Although FIG. 6 illustrates an electronic device 600 with various apparatuses, it should be understood that it is not required to implement or possess all the shown apparatuses. More or fewer apparatuses may be implemented or possessed alternatively. Each box shown in FIG. 6 may represent one apparatus or multiple apparatuses as needed.

In particular, according to some embodiments of the present disclosure, the process described above with reference to the flowchart may be implemented as a computer software program. For example, some embodiments of the present disclosure comprise a computer program product that includes a computer program hosted on a computer-readable medium, the computer program includes program codes for executing the method shown in the flowchart. In such embodiments, the computer program may be downloaded from the network and installed through the communication apparatus 609, or installed from the storage apparatus 608, or installed from the ROM 602. When the computer program is executed by the processing apparatus 601, the above functions defined in the method of some embodiments of the present disclosure are performed.

It should be noted that the computer-readable medium recorded in some embodiments of this disclosure may be a computer-readable signal medium, a computer-readable storage medium, or any combination of the two. The computer-readable storage medium may be, for example, but not limited to, systems, apparatuses or components of electricity, magnetism, light, electromagnetism, infrared, or semiconductor, or any combination of the above. More specific examples of the computer-readable storage medium may include, but are not limited to: electrical connections with one or more wires, portable computer disks, hard drives, random access memory (RAM), read-only memory (ROM), erasable programmable read-only memory (EPROM or flash memory), optical fibers, portable compact disk read-only memory (CD-ROM), optical storage devices, magnetic storage devices, or any suitable combination of the above. In some embodiments of the present disclosure, the computer-readable storage medium may be any tangible medium containing or storing a program, the program may be used by or in combination with an instruction execution system, apparatus, or component. In some embodiments of the present disclosure, the computer-readable signal medium may include data signals propagated in the baseband or as part of the carrier, which carry a computer-readable program code. Data signals of such propagation may take various forms, including but not limited to electromagnetic signals, optical signals, or any suitable combination of the above. The computer-readable signal medium can also be any computer-readable medium other than a computer-readable storage medium. This computer-readable signal medium may send, propagate, or transmit programs for use by or in combination with an instruction execution system, apparatus, or component. The program code contained on the computer readable medium may be transmitted using any suitable medium, including but not limited to: optical wires, optical cables, RF (radio frequency), etc., or any suitable combination of the above.

In some implementations, clients and servers may communicate using any currently known or future developed network protocols such as HTTP (HyperText Transfer Protocol), and may interconnect with any form or medium of digital data communications (such as communication networks). Examples of communication networks include local area networks ("LANs"), wide area networks ("WANs"), internets (such as the Internet), and end-to-end networks (such as ad hoc end-to-end networks), as well as any currently known or future developed networks.

The computer-readable medium may be included in the aforementioned apparatus, and may also exist separately without being assembled into the electronic device. The computer-readable medium carries one or more programs, and when one or more programs are executed by the electronic device, the electronic device: determines a decoded-word information group set on the basis of a text to be processed, wherein the text to be processed is used for describing a specified object; de-duplicates the decoded-word information group set to generate a candidate-word information group set; selects, from each candidate-word information group in the candidate-word information group set, the candidate-word information that meets a target condition as the target-word information, to obtain a target-word information set; for each piece of target-word information in the target-word information set, in response to determining that the target-word information meets a convergence condition, splices, on the basis of a preset-word list, the target-word information with a historical target-word information sequence corresponding to the target-word information, to generate a target text.

The computer program code for executing the operation of some embodiments of the present disclosure may be written in one or more programming languages or combinations thereof. The programming languages include object-oriented programming languages such as Java, Smalltalk, C++, and further include conventional procedural programming languages such as "C" or similar programming languages. The program code may be completely executed on the user's computer, partially executed on the user's computer, executed as a standalone software package, executed partially on the user's computer and partially on a remote computer, or completely executed on a remote computer or server. In cases involving a remote computer, the remote computer may be connected to the user's computer through any type of networks, including a local area network (LAN) or wide area network (WAN), or may be connected to an external computer (such as using an Internet service provider to connect through the Internet).

The flowchart and block diagram in the accompanying drawings illustrate the architectures, functions, and operations that may be possibly implemented by the systems, methods, and computer program products according to the embodiments of the present disclosure. At this point, each box in the flowchart or block diagram may represent a module, program segment, or part of code. The module, program segment, or part of code contain one or more executable instructions for implementing specified logical functions. It should also be noted that in some alternative implementations, the functions indicated in the boxes may also occur in a different order than those indicated in the accompanying drawings. For example, two consecutive boxes may actually be executed basically in parallel, and sometimes they can also be executed in reversed order, depending on the functions involved. It should also be noted that each box in the block diagram and/or flowchart, as well as the combination of boxes in the block diagram and/or flowchart, may be implemented using dedicated hardware-based systems that perform specified functions or operations, or may be implemented using a combination of dedicated hardware and computer instructions.

The units described in some embodiments of the present disclosure may be implemented through software or hardware. The described units may also be set in the processor, for example, they may be described as: a processor comprising a determination unit, a de-duplicating unit, a selection unit, and a splicing unit. The names of these units in certain cases do not constitute limitations on the units per se. For example, the de-duplicating unit may also be described as "a unit that de-duplicates the decoded-word information group set to generate a candidate-word information group set".

The functions described above may be at least partially executed by one or more hardware logic components. For example, non-restrictively, exemplary hardware logic components that may be used include: Field Programmable Gate Arrays (FPGAs), Application Specific Integrated Circuits (ASICs), Application Specific Standard Products (ASSPs), Systems On Chip (SOCs), Complex Programmable Logic Devices (CPLDs), and so on.

The above description is merely some preferred embodiments of the present disclosure and illustrations of the applied technical principles. Those skilled in the art should understand that the scope of the invention involved in the embodiments of the present disclosure is not limited to the technical solutions formed by the specific combination of the above technical features, and should cover at the same time, without departing from the above inventive concept, other technical solutions formed by any combination of the above technical features or their equivalent features, for example, a technical solution formed by replacing the above features with the technical features of similar functions disclosed (but not limited to) in the embodiments of the present disclosure.

The invention claimed is:

1. A text generation method, comprising:
   determining a decoded-word information group set on the basis of a text to be processed, wherein the text to be processed is used for describing a specified object;
   de-duplicating the decoded-word information group set to generate a candidate-word information group set;
   selecting, from each candidate-word information group in the candidate-word information group set, candidate-word information that meets a target condition as target-word information, to obtain a target-word information set;
   for each piece of target-word information in the target-word information set, in response to determining that the target-word information meets a convergence condition, splicing, on the basis of a preset-word list, the target-word information with a historical target-word information sequence corresponding to the target-word information, to generate a target text, wherein the decoded-word information in the decoded-word information group set includes: decoded words and decoded-word probability values corresponding to the decoded words; and
   the de-duplicating the decoded-word information group set to generate a candidate-word information group set includes:
   for each decoded-word information group in the decoded-word information group set, dividing, based on the decoded words, the decoded-word information group into a duplicated decoded-word information group and a single decoded-word information group;
   selecting, from the duplicated decoded-word information group, duplicated decoded-word information that meets a preset condition as target duplicated decoded-word information;
   splicing the target duplicated decoded-word information with the single decoded-word information group to generate the candidate-word information group.

2. The method of claim 1, wherein, the determining a decoded-word information group set on the basis of a text to be processed includes:
   inputting the text to be processed into a text encoder to generate an encoding hidden layer vector;
   inputting the encoding hidden layer vector into a decoder to generate a decoded-word information group set.

3. The method of claim 2, wherein, the candidate-word information in the candidate-word information group set includes: candidate words and candidate-word probability values corresponding to the candidate words; and
   the selecting, from each candidate-word information group in the candidate-word information group set, candidate-word information that meets a target condition as target-word information includes:
   for each candidate-word information group in the candidate-word information group set, selecting at least one piece of candidate-word information from the candidate-word information group in descending order of the candidate-word probability values;
   placing candidate-word information with a largest probability value in the at least one piece of candidate-word information, in the historical target-word information set, determining at least one piece of initial target-word information of the candidate-word information with the largest probability value, and generating target-word information corresponding to the candidate-word information based on the at least one piece of initial target-word information; the initial target-word information in the at least one piece of initial target-word information includes: initial target words and initial target-word probability values corresponding to the initial target words.

4. The method of claim 2, wherein, the for each piece of target-word information in the target-word information set, in response to determining that the target-word information meets a convergence condition, splicing, on the basis of a preset-word list, the target-word information with a historical target-word information sequence corresponding to the target-word information, to generate a target text includes:
   for each piece of target-word information in the target-word information set, in response to determining that the target-word information meets a preset convergence condition, splicing the target-word information with a historical target-word information sequence corresponding to the target-word information, to generate a spliced text;

selecting, from the preset-word list, the words matching the spliced text as conjunctions;

combining the conjunctions with the spliced text to generate the target text.

5. The method of claim 1, wherein, the for each decoded-word information group in the decoded-word information group set, dividing, based on the decoded words, the decoded-word information group into a duplicated decoded-word information group and a single decoded-word information group includes:

for each decoded-word information group in the decoded-word information group set, in response to the decoded-word information group having other decoded-word information containing decoded words of the said decoded-word information, placing the decoded-word information and the other decoded-word information in the duplicated decoded-word information group; otherwise, placing the decoded-word information in the single decoded-word information group.

6. The method of claim 5, wherein, the candidate-word information in the candidate-word information group set includes: candidate words and candidate-word probability values corresponding to the candidate words; and the selecting, from each candidate-word information group in the candidate-word information group set, candidate-word information that meets a target condition as target-word information includes:

for each candidate-word information group in the candidate-word information group set, selecting at least one piece of candidate-word information from the candidate-word information group in descending order of the candidate-word probability values;

placing candidate-word information with a largest probability value in the at least one piece of candidate-word information, in the historical target-word information set, determining at least one piece of initial target-word information of the candidate-word information with the largest probability value, and generating target-word information corresponding to the candidate-word information based on the at least one piece of initial target-word information; the initial target-word information in the at least one piece of initial target-word information includes: initial target words and initial target-word probability values corresponding to the initial target words.

7. The method of claim 1, wherein, the candidate-word information in the candidate-word information group set includes: candidate words and candidate-word probability values corresponding to the candidate words; and the selecting, from each candidate-word information group in the candidate-word information group set, candidate-word information that meets a target condition as target-word information includes:

for each candidate-word information group in the candidate-word information group set, selecting at least one piece of candidate-word information from the candidate-word information group in descending order of the candidate-word probability values;

placing candidate-word information with a largest probability value in the at least one piece of candidate-word information, in the historical target-word information set, determining at least one piece of initial target-word information of the candidate-word information with the largest probability value, and generating target-word information corresponding to the candidate-word information based on the at least one piece of initial target-word information; the initial target-word information in the at least one piece of initial target-word information includes: initial target words and initial target-word probability values corresponding to the initial target words.

8. The method of claim 7, wherein, the generating target-word information corresponding to the candidate-word information based on the at least one piece of initial target-word information includes:

in response to the initial target word corresponding to the initial target-word information with the largest initial target-word probability value not belonging to the historical target-word information set, setting the initial target-word information with the largest initial target-word probability value as the target-word information, and placing the target-word information in the historical target-word information set.

9. The method of claim 7, wherein, the generating target-word information corresponding to the candidate-word information based on the at least one piece of initial target-word information includes:

in response to the initial target word corresponding to the initial target-word information with the largest initial target-word probability value belonging to the historical target-word information set, determining a duplicated-word probability difference between the initial target-word information with the largest initial target-word probability value and the historical target-word information corresponding to the historical target-word information set;

in response to the duplicated-word probability difference being greater than the initial target-word probability value of other initial target-word information corresponding to the candidate-word information, setting the initial target-word information with the largest initial target-word probability value as the target-word information, and placing the target-word information in the historical target-word information set.

10. The method of claim 9, wherein, the generating target-word information corresponding to the candidate-word information based on the at least one piece of initial target-word information includes:

in response to the initial target word corresponding to the initial target-word information with the largest initial target-word probability value not belonging to the historical target-word information set, setting the initial target-word information with the largest initial target-word probability value as the target-word information, and placing the target-word information in the historical target-word information set.

11. The method of claim 7, wherein, the generating target-word information corresponding to the candidate-word information based on the at least one piece of initial target-word information includes:

in response to the initial target word corresponding to the initial target-word information with the largest initial target-word probability value belonging to the historical target-word information set, determining a duplicated-word probability difference between the initial target-word information with the largest initial target-word probability value and the historical target-word information corresponding to the historical target-word information set;

in response to the duplicated-word probability difference being less than or equal to the initial target-word probability value of other initial target-word information corresponding to the candidate-word information, setting the initial target-word information with the largest initial target-word probability value in other initial target-word information as the target-word information, and placing the target-word information in the historical target-word information set.

12. The method of claim 11, wherein, the generating target-word information corresponding to the candidate-word information based on the at least one piece of initial target-word information includes:

in response to the initial target word corresponding to the initial target-word information with the largest initial target-word probability value not belonging to the historical target-word information set, setting the initial target-word information with the largest initial target-word probability value as the target-word information, and placing the target-word information in the historical target-word information set.

13. The method of claim 1, wherein, the for each piece of target-word information in the target-word information set, in response to determining that the target-word information meets a convergence condition, splicing, on the basis of a preset-word list, the target-word information with a historical target-word information sequence corresponding to the target-word information, to generate a target text includes:

for each piece of target-word information in the target-word information set, in response to determining that the target-word information meets a preset convergence condition, splicing the target-word information with a historical target-word information sequence corresponding to the target-word information, to generate a spliced text;

selecting, from the preset-word list, the words matching the spliced text as conjunctions;

combining the conjunctions with the spliced text to generate the target text.

14. The method of claim 1, wherein, the candidate-word information in the candidate-word information group set includes: candidate words and candidate-word probability values corresponding to the candidate words; and the selecting, from each candidate-word information group in the candidate-word information group set, candidate-word information that meets a target condition as target-word information includes:

for each candidate-word information group in the candidate-word information group set, selecting at least one piece of candidate-word information from the candidate-word information group in descending order of the candidate-word probability values;

placing candidate-word information with a largest probability value in the at least one piece of candidate-word information, in the historical target-word information set, determining at least one piece of initial target-word information of the candidate-word information with the largest probability value, and generating target-word information corresponding to the candidate-word information based on the at least one piece of initial target-word information; the initial target-word information in the at least one piece of initial target-word information includes: initial target words and initial target-word probability values corresponding to the initial target words.

15. The method of claim 1, wherein, the for each piece of target-word information in the target-word information set, in response to determining that the target-word information meets a convergence condition, splicing, on the basis of a preset-word list, the target-word information with a historical target-word information sequence corresponding to the target-word information, to generate a target text includes:

for each piece of target-word information in the target-word information set, in response to determining that the target-word information meets a preset convergence condition, splicing the target-word information with a historical target-word information sequence corresponding to the target-word information, to generate a spliced text;

selecting, from the preset-word list, the words matching the spliced text as conjunctions;

combining the conjunctions with the spliced text to generate the target text.

16. An electronic device, comprising:

at least one processor;

a storage apparatus on which at least one program are stored, and when at least one program are executed by at least one processor, the at least one processor implement a text generation method, comprising:

determining a decoded-word information group set on the basis of a text to be processed, wherein the text to be processed is used for describing a specified object;

de-duplicating the decoded-word information group set to generate a candidate-word information group set;

selecting, from each candidate-word information group in the candidate-word information group set, candidate-word information that meets a target condition as target-word information, to obtain a target-word information set;

for each piece of target-word information in the target-word information set, in response to determining that the target-word information meets a convergence condition, splicing, on the basis of a preset-word list, the target-word information with a historical target-word information sequence corresponding to the target-word information, to generate a target text, wherein the decoded-word information in the decoded-word information group set includes: decoded words and decoded-word probability values corresponding to the decoded words; and the de-duplicating the decoded-word information group set to generate a candidate-word information group set includes:

for each decoded-word information group in the decoded-word information group set, dividing, based on the decoded words, the decoded-word information group into a duplicated decoded-word information group and a single decoded-word information group;

selecting, from the duplicated decoded-word information group, duplicated decoded-word information that meets a preset condition as target duplicated decoded-word information;

splicing the target duplicated decoded-word information with the single decoded-word information group to generate the candidate-word information group.

17. A non-transitory computer-readable medium, on which a computer program is stored, wherein a text generation method is implemented when the program is executed by a processor, the text generation method, comprising:

determining a decoded-word information group set on the basis of a text to be processed, wherein the text to be processed is used for describing a specified object;

de-duplicating the decoded-word information group set to generate a candidate-word information group set;

selecting, from each candidate-word information group in the candidate-word information group set, candidate-word information that meets a target condition as target-word information, to obtain a target-word information set;

for each piece of target-word information in the target-word information set, in response to determining that the target-word information meets a convergence condition, splicing, on the basis of a preset-word list, the target-word information with a historical target-word information sequence corresponding to the target-word information, to generate a target text, wherein the decoded-word information in the decoded-word information group set includes: decoded words and decoded-word probability values corresponding to the decoded words; and the de-duplicating the decoded-word information group set to generate a candidate-word information group set includes:

for each decoded-word information group in the decoded-word information group set, dividing, based on the decoded words, the decoded-word information group into a duplicated decoded-word information group and a single decoded-word information group;

selecting, from the duplicated decoded-word information group, duplicated decoded-word information that meets a preset condition as target duplicated decoded-word information;

splicing the target duplicated decoded-word information with the single decoded-word information group to generate the candidate-word information group.

*    *    *    *    *